(12) United States Patent
McCalley et al.

(10) Patent No.: US 8,055,478 B2
(45) Date of Patent: Nov. 8, 2011

(54) MAINTENANCE MINDER FOR FORCED AIR HEATER

(75) Inventors: Steve McCalley, Langhorne, PA (US); Kyu Sam Hwang, Ansan (KR)

(73) Assignees: Pinnacle Products International, Inc., Yardley, PA (US); SP Elemech, Ansan (KR)

( * ) Notice: Subject to any disclaimer, the term of this patent is extended or adjusted under 35 U.S.C. 154(b) by 98 days.

(21) Appl. No.: 12/570,644

(22) Filed: Sep. 30, 2009

(65) Prior Publication Data
US 2010/0033335 A1 Feb. 11, 2010

Related U.S. Application Data

(62) Division of application No. 11/711,220, filed on Feb. 27, 2007.

(51) Int. Cl.
*G08B 17/00* (2006.01)
(52) U.S. Cl. ... 702/188; 126/61; 126/110 B; 126/110 C; 126/110 D; 340/588
(58) Field of Classification Search ............ 702/188; 126/61, 110 C, 110 B; 340/588; 236/49.1, 236/49.3, 49.4, 51; 5/201, 202, 181, 176.1, 5/285, 286; 280/30, 47.18, 47.29, 652; 297/129, 297/162; 296/3, 36
See application file for complete search history.

(56) References Cited

U.S. PATENT DOCUMENTS

| | | | | |
|---|---|---|---|---|
| 3,645,512 A | * | 2/1972 | Dent et al. | 432/223 |
| RE31,384 E | * | 9/1983 | Mis | 5/202 |
| 4,404,715 A | | 9/1983 | Sugimoto | |
| 4,443,187 A | * | 4/1984 | Shaftner et al. | 432/222 |
| 4,729,365 A | * | 3/1988 | Mutchler | 126/110 B |
| 5,388,852 A | | 2/1995 | Bigo et al. | |
| 5,505,323 A | * | 4/1996 | Naoki et al. | 220/4.28 |
| 6,186,571 B1 | * | 2/2001 | Burke | 296/3 |
| 6,375,200 B1 | * | 4/2002 | Harter | 280/30 |
| 6,438,810 B2 | | 8/2002 | Rogers, Jr. et al. | |
| 6,694,578 B1 | | 2/2004 | Nicoll | |
| 6,830,260 B2 | | 12/2004 | Everett | |
| 6,868,583 B2 | | 3/2005 | Kuo | |
| 6,997,390 B2 | * | 2/2006 | Alles | 236/49.4 |
| 7,143,912 B2 | * | 12/2006 | Caneba | 224/153 |
| 7,188,001 B2 | * | 3/2007 | Young et al. | 700/266 |
| 2004/0122559 A1 | * | 6/2004 | Young et al. | 700/269 |
| 2005/0116055 A1 | * | 6/2005 | Alles | 236/49.1 |

* cited by examiner

*Primary Examiner* — Carol Tsai
(74) *Attorney, Agent, or Firm* — Volpe and Koenig, P.C.

(57) ABSTRACT

The present invention includes a frame that is quickly and easily assembled and disassembled. The frame may be used for supporting a portable forced air heater, or other similar equipment. Handles, supports, and optionally a wheel assembly is assembled to two core members using snap lock buttons. In a preferred embodiment, the portable forced air heater includes a maintenance clock for measuring and recording operational parameters of a portable forced air heater, and for notifying a user that maintenance is required.

7 Claims, 5 Drawing Sheets

MAINTENANCE MINDER FOR FORCED AIR HEATER

FIELD OF INVENTION

The present invention generally relates to an apparatus for identifying when maintenance is required for a forced air heater. More particularly, the present invention relates to a portable forced air heater with a quickly and easily assembled frame and a device for monitoring the conditions of the air heater.

BACKGROUND

Portable forced air heaters provide efficient temporary heating. Portable forced air heaters may be used in a variety of settings, including construction sites, agricultural buildings, industrial workspaces, remodeling jobs, loading docks, and the like. A typical forced air heater includes a fuel storage tank, a combustion chamber, and a blower or fan. The term "forced air" means that the blower or fan pushes air through the combustion chamber. Proper combustion of the fuel depends upon this air flow. Kerosene is a frequently preferred fuel for forced air heaters because of its ability to burn at almost 100% efficiency.

Forced air heaters may be direct fired or ventilated. In a direct fired forced air heater, all of the combustion products enter the heated spaced. In other words, a direct fired forced air heater is not ventilated. A ventilated forced air heater has an exhaust system that removes combustion products via a flue.

Portable forced air heaters, particularly larger units having large fuel storage tanks, are typically supported by a tubular frame, most typically steel. Wheels may be provided so that a user may easily position the heater as desired. The tubular frames of prior art portable forced air heaters are either welded as a single unit or require assembly. The welded single unit frames are bulky and therefore more costly to transport. Frames requiring assembly are not preferred as they may be difficult to assemble or may be subject to incorrect assembly.

A frame according to the present invention addresses the disadvantages of the prior art.

Operating equipment generally requires regular maintenance and servicing in order to continue working effectively. For example, most automobile engines typically require oil changes and maintenance after set periods, such as 3000 miles or 3 months. Kerosene forced air heaters, like automobile engines, require regular maintenance as well. However, currently such heaters lack any means for automatically monitoring the runtime of the heater. The lack of a built in monitor requires the user to manually record and operating time and determine maintenance and servicing needs.

SUMMARY

The present invention provides an equipment unit with a quickly and easily assembled frame and a maintenance monitor for measuring and recording operational parameters and required service.

BRIEF DESCRIPTION OF THE DRAWINGS

A more detailed understanding of the invention may be had from the following description, given by way of example and to be understood in conjunction with the accompanying drawings, wherein.

DETAILED DESCRIPTION OF THE PREFERRED EMBODIMENTS

Figure 1:
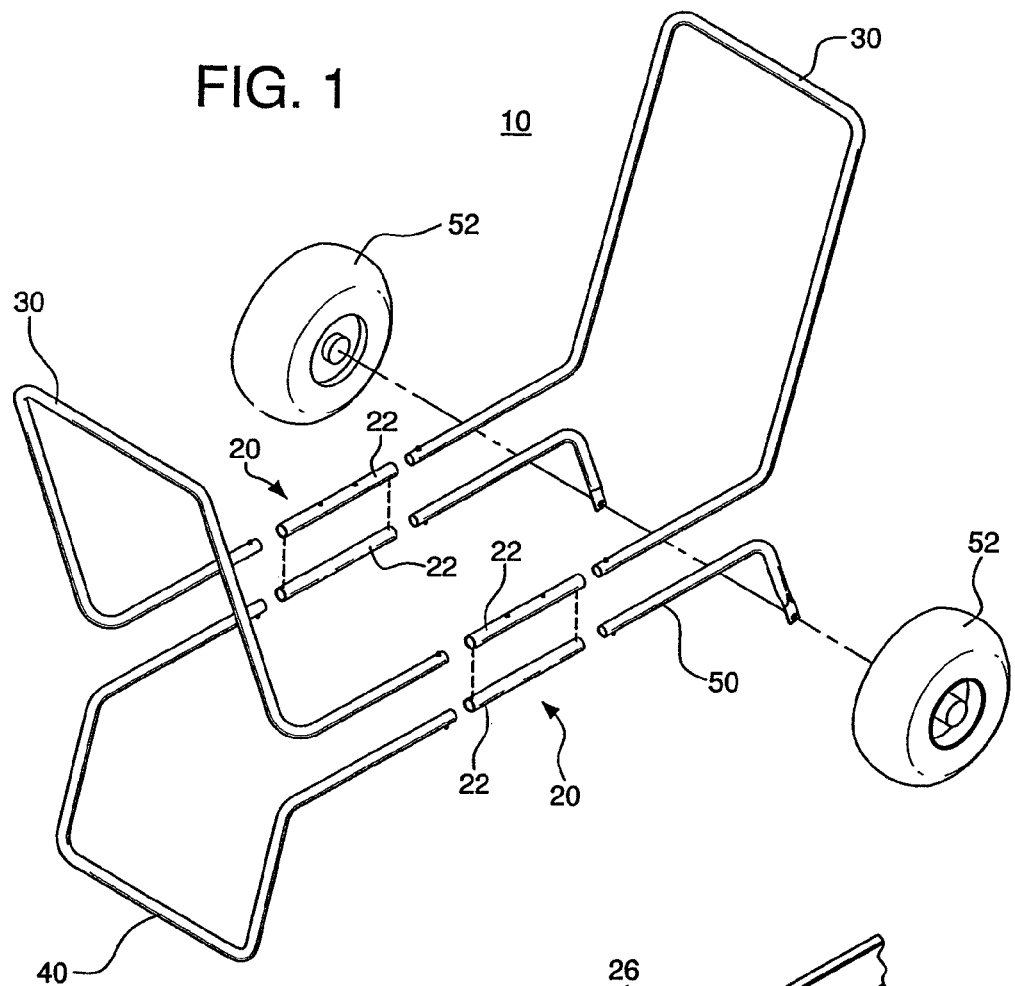
FIG. 1 is an exploded perspective view of a modular frame in accordance with a preferred embodiment of the present invention.
Figure 2:
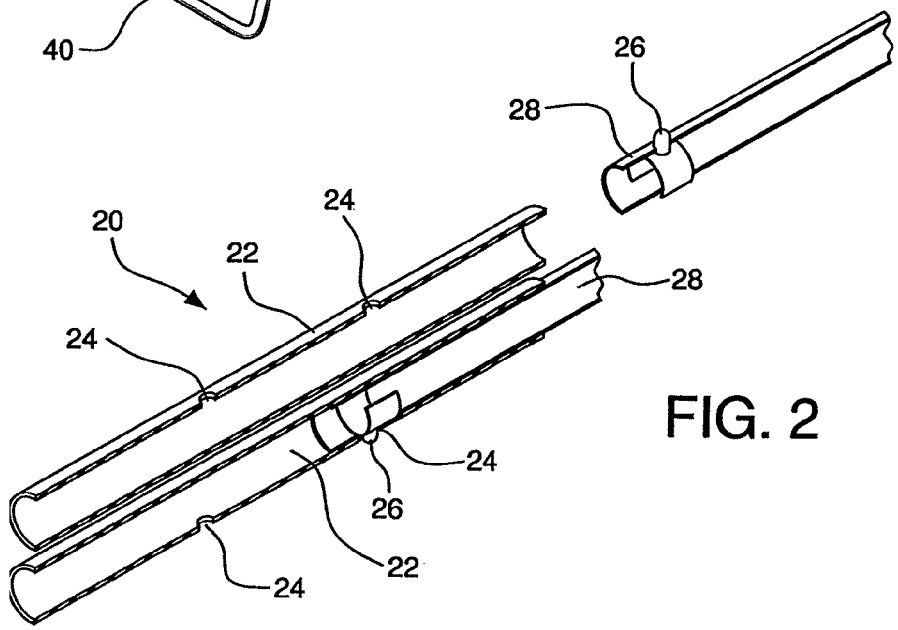
FIG. 2 is a cross section illustrating the interconnecting components of the modular frame of FIG. 1.

In a preferred embodiment of the present invention, a modular frame is assembled and disassembled using interlocked members and snap-lock buttons. Referring to FIGS. 1 and 2, an exploded view of the preferred modular frame 10 is shown. A pair of core members 20 is the central connection point for all other components of the frame 10. Each core member 20 preferably comprises two mating tubes 22, which are preferably formed as female members. The two female mating tubes 22 are preferably permanently connected to the heater as discussed below with reference to FIG. 3, but may also be removably interconnected with hardware, such as nuts and bolts. The two female mating tubes 22 are sized to secure a corresponding male mating tube 28.

Each female mating tube 22 includes apertures 24 for receiving the biased member or button 26 of a male mating tube 28. Male mating tube 28 has an outer diameter that is slightly smaller than the inner diameter of the female mating tubes 22 such that a snug fit is achieved and the parts are rigidly assembled. Preferably, the female mating tubes 22 have a ⅞" inner diameter and the male mating tubes 28 have a ¹³⁄₁₆" outer diameter, thereby providing a snug fit. The variance in the diameters of the mating tubes 22 and 28 may be selected to achieve a desired rigidity of the frame 10. The overall diameters and thickness of the mating tubes 22 and 28 may again be selected to achieve a desired strength of the frame 10.

Preferably, two handles 30 are U-shaped and include the mating ends 28 with a biased member 26 at each end which complements an aperture 24 upon insertion in a female mating tube 22 of each core member 20. Referring particularly to FIG. 2, upon alignment with aperture 24, the member 26 is biased upwardly through the aperture 24 locking the male mating ends 28 in place inside the female mating tube 22. The depth of the overlap of the male mating ends 28 and the female mating tube 22 may be selected as desired. However, insertion of at least one third of the length of the male mating ends 28 into the female mating tube 22 is preferred as providing a more rigid assembled frame 10.

It should be noted that the biasing of the member 26 may be achieved in a variety of ways which are evident to those skilled in the art. FIGS. 1 and 2 show a piece of spring metal positioned inside the male mating tube 28 merely as an example, and this is not meant to limit the scope of the present invention.

Each handle 30 is preferably angled such that a user of the frame 10 may receive the handles at a comfortable height. Although the handles 30 are shown in FIG. 1 as being generally the same size, this is exemplary. The handles 30 may be sized as desired based on the size of the forced air heater being supported, the size limitations of an anticipated operating environment, or other size considerations that may arise.

A support stand 40, which is again preferably U-shaped and includes male mating tubes 28 having members 26, is inserted into the corresponding female mating tubes 22 of each core member 20 in the same manner as described above. Two wheel supports 50, which include male mating tubes 28 having members 26, complete the frame 10 when inserted into the remaining female mating tubes 22. Preferably, two wheels 52 are supported by the wheel supports 50 individually by way of an axle 54. The axle 54 is preferably shaped to maintain the spacing between the wheel supports 50. Cap fasteners 56 secure the wheels 52 on the axle 54. Alternatively, the fasteners 56 may be replaced with cotter pins or other securing members. The axle 54 may be replaced by spindles that pass through and abut, or are integral with, each support 50 to join each wheel 52 to a support. Alternatively, a second support stand 40 may be provided when a wheeled frame is not desired.

The frame 10 is preferably constructed from tubular steel, but may be constructed from aluminum, titanium, or various other metals as desired.

Figure 3:
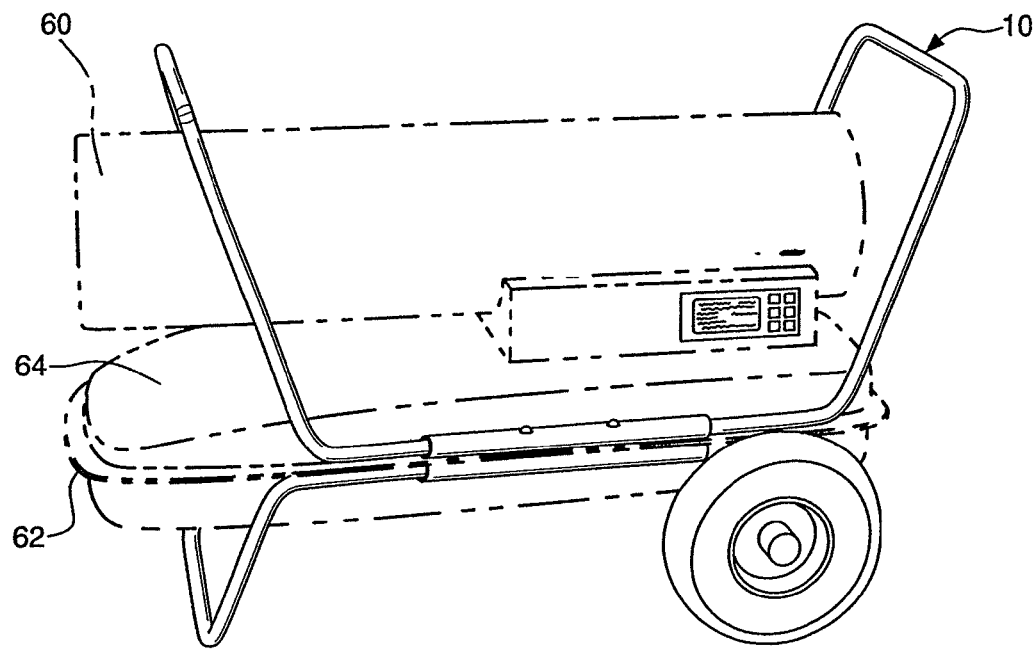
FIG. 3 is a perspective view of the modular frame of FIG. 1 fully assembled and supporting a portable forced air heater.
Figure 4:
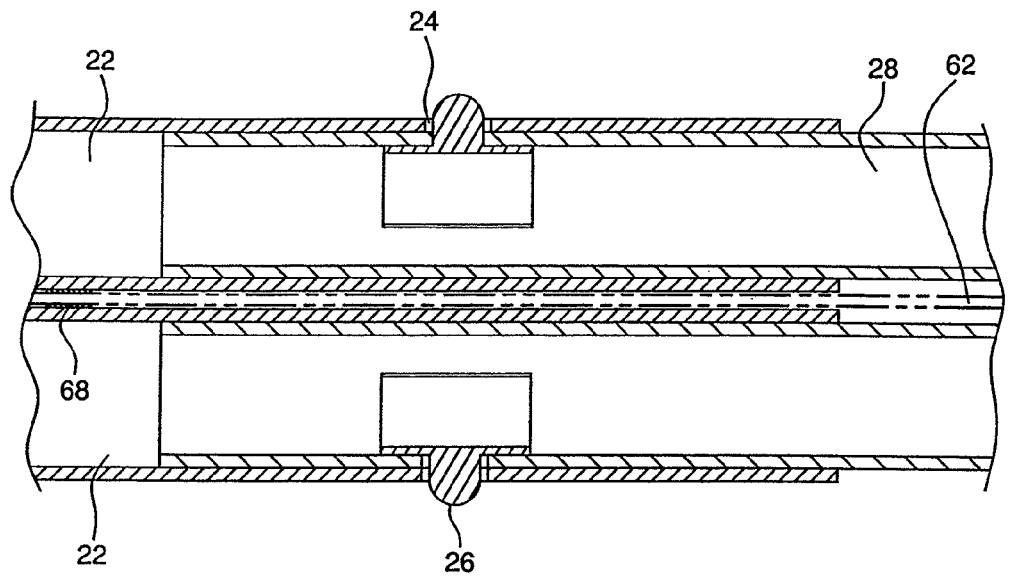
FIG. 4 is a cross section illustrating the interconnecting components of the assembled modular frame of FIG. 3.

FIGS. 3 and 4 show the frame 10 assembled and supporting a forced air heater 60. While the frame 10 may be removably interconnected to the heater 60 using nuts and bolts, it is preferred that the core members 20 are permanently affixed to the heater 60, by way of a plurality of weldments 68, for example. In either case, the flange 62 located on the fuel tank 64 of the forced air heater 60 acts as the attachment point for the core members 20.

Figure 5:
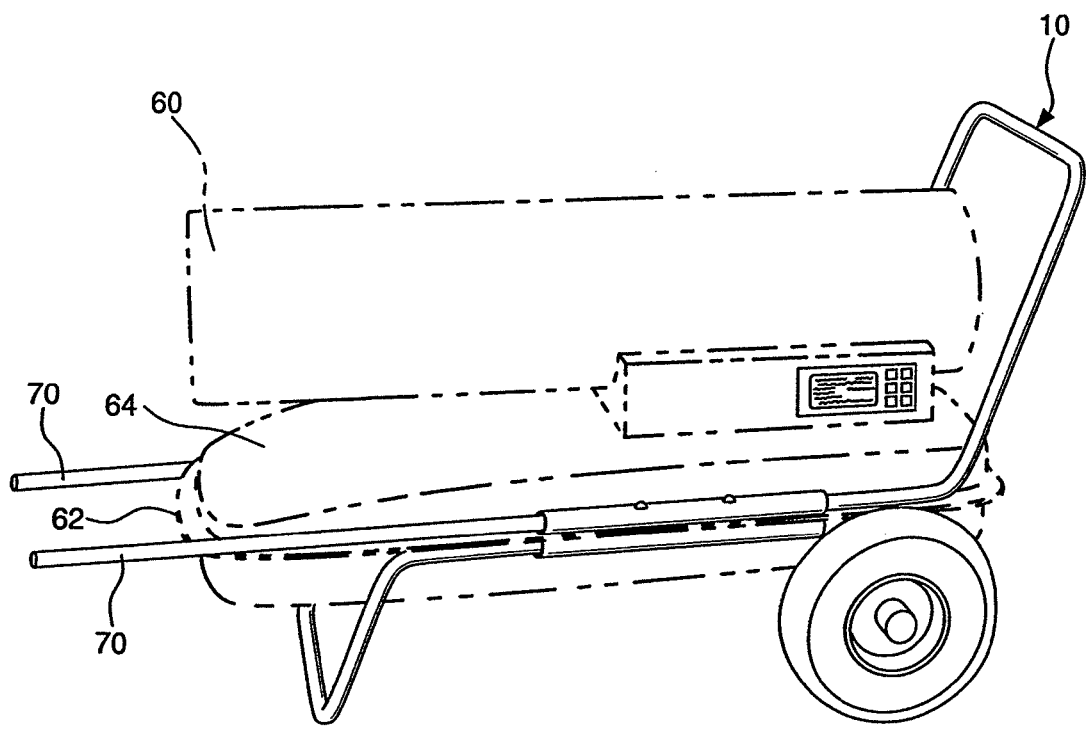
FIG. 5 is a perspective view of a modular frame in accordance with an alternative embodiment of the present invention.

In an alternative embodiment, referring to FIG. 5, a projecting handle 70 allows an operator to maneuver the frame 10, similar to a wheelbarrow. This embodiment is advantageous in that the handle 70 is positioned away from the heater 60, and provides improved leverage. If desired, the wheels 52 and handle 70 may be reversed.

Figure 6:
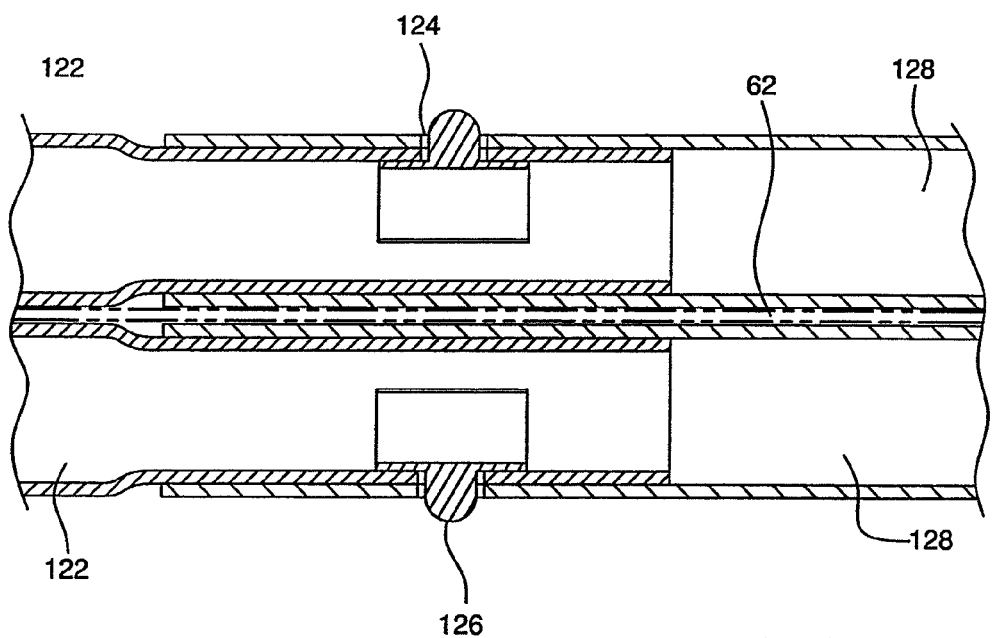
FIG. 6 is a cross section illustrating an alternative interconnection arrangement in accordance with an alternative embodiment.

In an alternative embodiment, shown in FIG. 6, core members 120 are tapered to form male mating ends 122 including a biased member 126 for securing a corresponding female mating tube 128. In this manner, the female mating tubes 128 may rest upon the flange 62 of the fuel tank 64, increasing the rigidity of the frame and providing a smooth transition between the mating components. It is noted that any combination of male and female mating tubes may be utilized as desired.

It is also noted that although the quick assembly frame of the present invention is described herein as supporting a portable forced air heater, it may be used for various other industrial devices that require a portable frame that is quickly and easily assembled.

Figure 7:
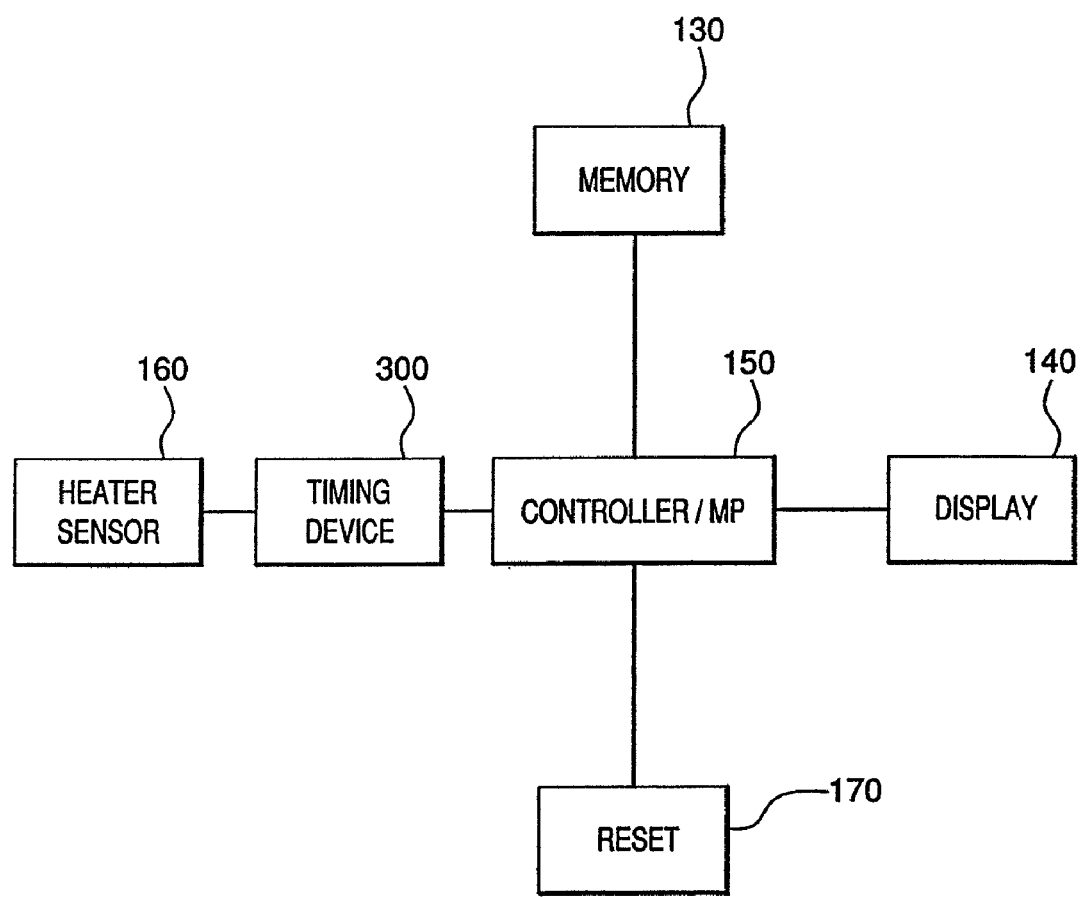
FIG. 7 is a block diagram of device for measuring and recording operational parameters of a portable forced air heater.

In the embodiment illustrated in FIG. 7, a monitor with an activity sensor is coupled with a timing device for measuring operating-time 300 which is further coupled with a controller 150. The controller 150 records the operating-time data in a memory module 130. The controller 150 also records the most recent date of servicing on the memory module 130. A display 140 is also provided so that a user can view the operating-time and service history, the controller 150 accesses the memory and outputs the information onto the display 140. Finally, a means to reset 170 the device is provided, so after servicing the display can return to its normal state. By activating the reset operation, the controller 150 adjusts the memory data to accurately reflect the latest servicing information. Other embodiments of this invention may contain additional sensors for monitoring activity in addition to or instead of the activity sensor. Other possible sensors include safety sensors designed to shut the heater off if an unsafe condition occurs or if the safety device fails. Most notable are the photocell sensor (to stop the flow of fuel to the combustion chamber if ignition fails or combustion ceases) and a temperature limit sensor (to shut down the heater if an overheat condition occurs.)

Figure 8:
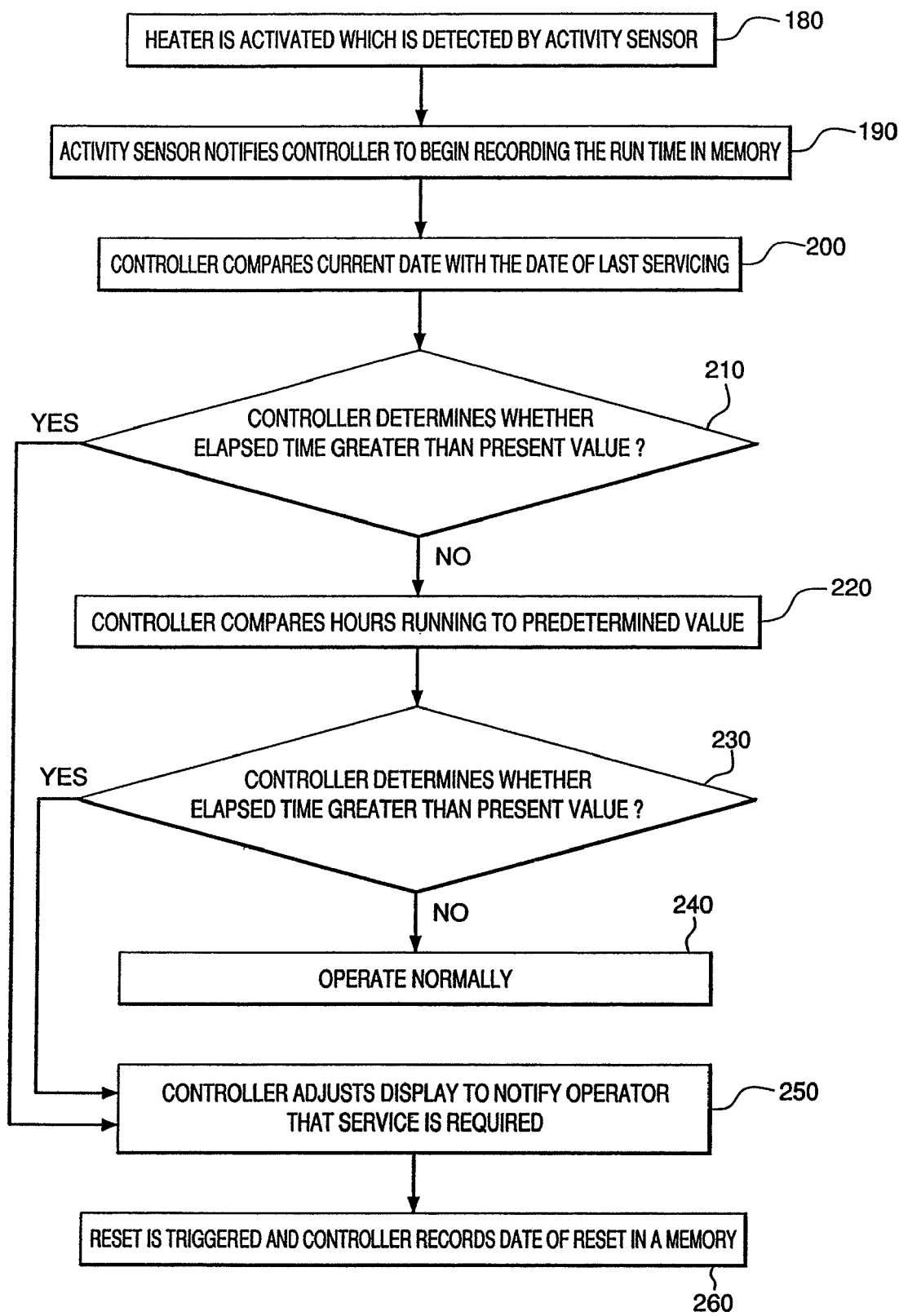
FIG. 8 is a flow diagram associated with a device for measuring and recording operational parameters of a portable forced air heater.

Referring to FIG. 8, there is a flow chart of one embodiment of the invention. When the heater is activated 180, an activity sensor 160 detects the operation and notifies the controller which begins recording the run or operating-time of the heater 190 which is then stored in the memory 200. The memory 200 is consulted to compare the date of last servicing with the current date and determine if service is necessary. The apparatus at the same time or sequentially will also compare the operating-time with a predetermined value 220 and determine whether servicing is necessary. Should either indicate that service is necessary; the display 250 will alert the operator that service is required; otherwise it will operate normally 240. Possible alerts include a light emitting diode (LED) or a liquid crystal display (LCD) that alerts an operator of required service. Upon performing maintenance, the reset function is engaged to reset the display which will also update the memory module 260 noting the new service date. Potential elements that may need regular servicing on a heater include but are not limited to carbon rotors/vane assembly, air filters, lint filters, spark plugs and nozzles.

In a preferred embodiment of the invention, the memory stores a table of maintenance or action items. The memory is scanned for potential maintenance issues and to check the status of each service task at each start up. Alternatively, the operator can manually call for a memory scan. This feature allows the operator to know in advance about scheduled maintenance or service issues. An example of the types of information that may be stored in the memory is displayed in Table 1. For each category of service, the memory will record the dates and elapsed operating time since the previous service, each of the items can be reset by engaging the reset button.

TABLE 1

| Type of Action Required | Date of Most Recent Repair | Elapsed Time Since Most Recent Repair (Hours) | Total Running Time (Hours) | Next Scheduled Repair |
|---|---|---|---|---|
| Heater Servicing | 8/12 | 30.5 | 1400 | 11/12 |
| Starter Replacement | 9/2 | 12 | 1300 | 10/2 |
| Carbon Rotor/Vane Assembly | 4/5 | 23 | 456 | 5/5 |
| Air Filter | 7/4 | 45 | 700 | 9/4 |
| Nozzle | 9/3 | 6 | 5600 | 12/3 |

As illustrated in the above Table 1, one item may require attention monthly and another may need servicing quarterly. Since the monitor is automatically advance by use or time, the operator is not required to remember different service period or scheduled dates.

Monitoring of the operation time and time between servicing is only one possible embodiment of the present invention. In another embodiment of this invention the invention would be equipped to display additional diagnostic information allowing a user to trouble shoot a heater that is performing poorly. Such capabilities include but are not limited to coupling the heater with a sensor for sensing when a heater fails to ignite or burns at unusual combustion performance which would then alert the operator that servicing or maintenance is required. In yet another embodiment a built-in air pressure gauge would display the air pressure setting of the heater allowing the user to determine if the air pressure settings is correct. Such diagnostics would assist in the trouble shooting and repair of non-routine replacement items such as motors, printed circuit boards (PCB's), fuses, transformers, etc. in addition to the routine replacement items.

What is claimed is:

1. An apparatus for identifying when maintenance is required for a forced air heater, the apparatus comprising:
   an activity sensor that detects when the heater is in operation and transmits operating data to a memory that records data from the activity sensor;
   a timer that tracks a running time of the heater;
   a controller for generating display information and for determining whether maintenance is required for the heater based on predetermined values, at least one of the predetermined values being a maximum total running time between maintenance that is compared with the tracked running time of the heater; and
   a display controlled by the controller and configured for displaying the display information supplied by the controller to indicate when maintenance is required.

2. The apparatus of claim 1, wherein the controller includes a reset to reset the display after maintenance has been performed.

3. Apparatus of claim 1, wherein the controller compares a last maintenance date with a current date to determine whether maintenance is required.

4. The apparatus of claim 1, wherein the sensor monitors a temperature of the heater to determine the running time.

5. The apparatus of claim 1, wherein the sensor monitors an electrical current to determine the running time.

6. A portable forced air heater comprising:
   a frame comprising:
      at least one core member, having at least one mating end, that is connected to an industrial implement;
      at least one projecting member, having at least one mating end that complements the core member's mating end, and is sized appropriately for the industrial implement; and
      at least two mating lock elements, one of which is associated with the core member and one of which is associated with the projecting member; and
   an apparatus for identifying when maintenance is required comprising:
      a sensor configured for sensing when the heater is operating and for transmitting operating data;
      a memory configured for recording data from the sensor;
      a timer that tracks a running time of the heater;
      a controller for generating display information and for determining whether maintenance is required for the heater based on predetermined values, at least one of the predetermined values being a maximum total running time between maintenance that is compared with the tracked running time of the heater; and
      a display controlled by the controller and configured for displaying the display information supplied by the controller to indicate when maintenance is required.

7. A maintenance minder for a forced air heater, the minder comprising:
   a memory for storing maintenance information;
   an activity sensor that detects when a heater is in operation and transmits operating data, including a tracked running time of the heater, to the memory;
   a controller determining when maintenance is required, based upon the operating data and the stored maintenance information, including comparison of the tracked running time of the heater against a predetermined maximum total running time between maintenance, and for generating maintenance related information; and
   a display that receives and displays the maintenance related information generated by the controller.

* * * * *